United States Patent [19]

Füssl et al.

[11] 4,392,821

[45] Jul. 12, 1983

[54] CALCINING FURNACE WITH GAS-PERMEABLE WALL STRUCTURE

[75] Inventors: Erwin Füssl, Zurich; Norbert Berger, Thalwil, both of Switzerland

[73] Assignee: Maerz Ofenbau AG, Zurich, Switzerland

[21] Appl. No.: 308,561

[22] Filed: Oct. 5, 1981

[30] Foreign Application Priority Data

Oct. 14, 1980 [CH] Switzerland .......................... 7665/80

[51] Int. Cl.³ .......................... F27D 1/08; F27B 3/24; F23M 5/02
[52] U.S. Cl. ...................................... 432/96; 110/338; 432/173
[58] Field of Search .................. 432/95, 96, 173, 175; 110/338

[56] References Cited

U.S. PATENT DOCUMENTS

| 1,202,387 | 10/1916 | Hitchcock | 110/338 |
| 2,289,719 | 7/1942 | Moran | 432/175 |
| 2,311,350 | 2/1943 | Richardson | 432/175 |
| 3,544,090 | 12/1970 | Peeters | 432/95 |
| 4,289,482 | 9/1981 | Füssl | 432/96 |

Primary Examiner—John J. Camby
Attorney, Agent, or Firm—Toren, McGeady and Stanger

[57] ABSTRACT

A calcining kiln for burning limestone or similar mineral raw material is formed with a wall structure which is gas-permeable at least in a region adjacent the openings of burners extending to the interior of the kiln with a compressed gaseous medium being supplied through the gas-permeable wall structure toward the interior of the kiln.

4 Claims, 2 Drawing Figures

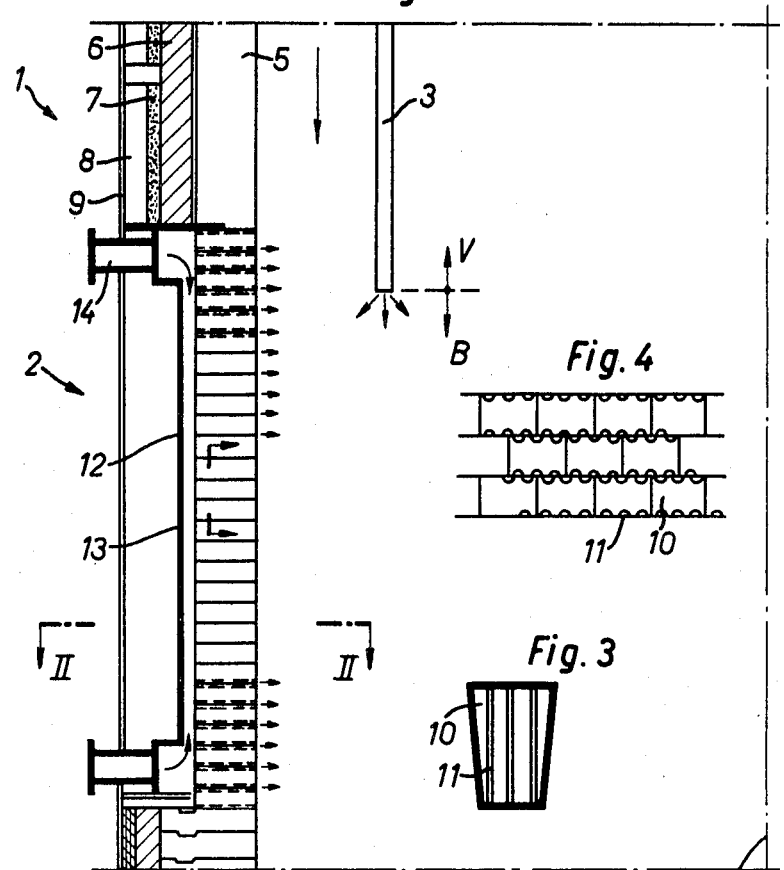

CALCINING FURNACE WITH GAS-PERMEABLE WALL STRUCTURE

The present invention relates generally to calcining kilns for burning limestone or similar raw materials and more particularly to the structure of the kiln wall for a kiln which includes at least one burner arranged at a distance from the wall of the kiln.

Kilns of the type to which the present invention relates have been fired with gaseous and liquid fuel. Additionally, solid fuels, such as coal dust, have also been used. A kiln of this type may, for example, be a rotary kiln or a shaft kiln. The uniflow regenerative shaft kiln which operates in accordance with the regenerative method is also known and heat consumption of such a kiln has been found to be particularly advantageous. This shaft kiln may be heated with gaseous or liquid fuels. Here again, solid fuels, such as pulverized coal, may also be used with the fuel being fed into the material to be calcined by means of burner openings which are located at the end of a preheating zone of the kiln or at the beginning of a combustion zone of the kiln. In such an arrangement, combustion air flows unidirectionally from the top to the bottom in the charge and reaches a preheating temperature of approximately 700° C.

In such kilns, one or several burner openings can be provided which are formed at the end portions of fuel lances or tubes which are suspended in the charge and through which the fuel feed occurs.

Solid fuels such as pulverised coal contain varying amounts of ash content. Some types of coal, such as brown coal, have an ash content which is approximately only about 4 percent. On the other hand, bituminous coals or anthracite may contain up to 22 percent ash. Additionally, the chemical composition and the melting point of the ashes may vary significantly.

For example, the ash of lignite having high volatile components exceeding 35 percent may have a basic composition, while the ash of most other coals may be acid. The melting point of the ash may fluctuate between 1100° and 1500° C.

The burner openings of the fuel lances must be arranged at a distance from the kiln wall such that the limestone which is located near the kiln wall will become adequately calcined. If there are utilized fuels with high calorific value which are burned with air having been preheated to approximately 700° C., very high flame temperatures will result. This is clearly desirable when using liquid or gaseous fuels due to the fact that at the beginning of the combustion zone of a uniflow regenerative lime shaft kiln, the heat requirement for burning of the limestone is very high. In such cases, a suitable refractory material may be selected for lining of the kiln walls which will not be damaged by the high temperatures of the combustion gases.

If the calcining kiln is to be fired with pulverised coal which contains ash, melted ash may deposit on the refractory walls, particularly if the ash has a low melting point. These deposits tend to increase rapidly over a period of time and controlled kiln operation and the production of good quality lime may become impossible.

Thus, the present invention is directed toward the development of a calcining kiln of the type described wherein the formation of interfering deposits on the kiln walls will be reliably prevented, but is not limited to a regenerative lime kiln.

SUMMARY OF THE INVENTION

Briefly, the present invention may be defined as an improvement in the wall structure of a calcining kiln for burning limestone or similar mineral raw materials having wall means of refractory material and burner means including at least one burner having a burner opening arranged within the kiln at a distance from the kiln wall means. The improvement comprises that in the region below the burner opening, the wall means is constructed to be gas-permeable and that a compressed gaseous medium is supplied through the gas-permeable wall means toward the interior of the kiln.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there is illustrated and described a preferred embodiment of the invention.

DESCRIPTION OF THE DRAWINGS

In the drawings:

FIG. 1 is a vertical sectional view showing part of a kiln in the end region of the preheating zone and in the beginning of the combustion zone wherein the wall means are structured in accordance with the present invention;

FIG. 2 is a sectional view taken along the line II—II of FIG. 1;

FIG. 3 is a top view showing a part of the brickwork of the kiln of FIG. 1; and

FIG. 4 is an enlarged side view depicting the inside of the wall of the kiln.

DETAILED DESCRIPTION OF THE PREFERRED EMBODIMENT

Referring now to the drawings, the present invention will be described in connection with a shaft kiln wherein the feed of the fuel, e.g., pulverised coal, occurs by means of fuel lances which are suspended in the kiln shaft.

As indicated in FIG. 1, there is depicted one of the fuel lances 3 through which fuel may be supplied to the furnace. The fuel lance 3 defines at the lower end thereof a fuel opening 4. The location of the fuel opening 4 defines the partition between a preheating zone V and a combustion zone B of the furnace. Thus, the end of the preheating zone V and the beginning of the combustion zone B will be found located at the level of the fuel opening 4 of the lance 3.

The fuel lance 3 is arranged a distance from a wall structure 1 of the furnace. The wall structure 1 may be constructed in different ways and in the region of the preheating zone V, the wall structure 1 includes an inner wall section 5 which consists of refractory bricks such as, for example, fire clay, which are followed on the exterior side thereof by refractory plates 6. On the exterior side of the plates 6 there are provided an additional refractory layer 7 and an insulation layer 8 which is surrounded by a steel shell 9. In the combustion zone B, the wall structure 1 consists of refractory bricks 10, e.g., magnesite bricks, which are adjoined by the refractory plates 6, the insulation layer 8, and the steel shell 9.

As will be evident from FIG. 1, in a region beginning at the end of the preheating zone V and ending at the beginning of the combustion zone B, a wall structure 2 is provided which is constructed to be gas-permeable. As shown in an enlarged scale in FIGS. 3 and 4, the bricks 10 are provided on both lateral surfaces thereof with grooves 11 which extend over the width of the wall structure. A compressed gas, e.g., compressed air, is provided into the interior of the furnace shaft through the grooves 11 in the bricks 10. Thus, over the length of the height of the bricks provided with the grooves 11, a screen or veil of cooling gas is formed which will reliably prevent adherence of melted ash to the interior of the wall.

The wall structure 2 has on the outer side thereof a steel shell 12 which is arranged to form around the outer side of the wall structure an annular gap 13. The compressed medium, e.g., compressed air, is introduced into the annular gap 13 by means of sockets or inlet tubes 14 and the compressed air flows through the grooves 11 in the bricks 10 into the interior of the furnace shaft.

Instead of the bricks 10 provided with the grooves 11, the wall structure 2 may be formed to consist of refractory bricks which have a greater number of pores or capillary openings. In this case, it is not necessary to install the grooves at the lateral walls because the compressed medium may penetrate through the pores or capillary openings into the interior of the furnace shaft and thereby prevent in a similar manner the adherence of the melted ash.

As will be evident from FIG. 2, the furnace shaft is formed with a circular cross-sectional configuration having a shaft axis 15. The steel shell 12 which forms the annular gap in the wall structure 2 is held in place by means of supports 16 located a desired distance from the bricks 10 with the outer steel shell 9 being supported by means of supports 17 at the inner steel shell 12.

The gas-permeable wall structure described above may also be applied in also calcining furnaces such as, for example, revolving tubular furnaces.

While a specific embodiment of the invention has been shown and described in detail to illustrate the application of the inventive principles, it will be understood that the invention may be embodied otherwise without departing from such principles.

What is claimed is:

1. A regenerative shaft kiln for burning limestone or similar raw materials comprising: wall means formed of refractory material defining a kiln interior; burner means including at least one burner located in said kiln interior, said at least one burner having a burner opening arranged within said kiln at a distance from said wall means; an outer metallic shell surrounding said wall means on the outer side thereof and spaced therefrom in order to define an annular gap between said outer metalic shell and said wall means; and means for supplying a compressed gaseous medium into said gap between said outer metallic shell and said wall means; said wall means consisting essentially of refractory bricks having formed therein grooves in at least one lateral wall of said bricks, said grooves being formed to extend from an outer side of said bricks to an inner side thereof in order thereby to form said wall means to be gas-permeable at least in the region of said burner opening, said grooves being thus formed to extend completely through said wall means in flow communication between said gap and the interior of said furnace thereby effecting flow of said compressed gaseous medium therethrough.

2. A kiln according to claim 1 wherein said kiln is fired with pulverised coal.

3. A kiln according to claim 2 or 1 wherein said kiln is structured to define a preheating zone and a combustion zone and wherein said gas-permeable wall means extend from an end region of said preheating zone to a beginning region of said combustion zone.

4. A kiln according to claim 1 wherein said gas-permeable wall means extend along the height of said kiln for a length of between 1.5 to 3.5 meters.

* * * * *